United States Patent

Steinigke

(10) Patent No.: US 6,510,393 B1
(45) Date of Patent: Jan. 21, 2003

(54) METHOD FOR DETECTING FAULTS IN A SWITCHING DEVICE

(75) Inventor: Klaus Steinigke, Munich (DE)

(73) Assignee: Siemens Atkiengesellschaft (DE)

( * ) Notice: Subject to any disclaimer, the term of this patent is extended or adjusted under 35 U.S.C. 154(b) by 0 days.

(21) Appl. No.: 09/868,460

(22) PCT Filed: Dec. 1, 1999

(86) PCT No.: PCT/EP99/09365
§ 371 (c)(1),
(2), (4) Date: Jun. 18, 2001

(87) PCT Pub. No.: WO00/38395
PCT Pub. Date: Jun. 29, 2000

(30) Foreign Application Priority Data

Dec. 21, 1998 (EP) .............................. 98124403

(51) Int. Cl.⁷ ............................................... G01R 31/08
(52) U.S. Cl. ............................................ 702/58; 714/4
(58) Field of Search .............................. 702/58, 35–40, 702/78, 79, 84, 182, 183, 185, 188; 714/2, 4, 6, 18, 25, 34, 39, 41, 47, 48, 712, 746, 799, 821; 455/423, 428, 63, 226.1; 324/500, 512, 532, 535; 340/931, 506, 511, 514

(56) References Cited

U.S. PATENT DOCUMENTS

| | | | | |
|---|---|---|---|---|
| 4,449,073 A | * | 5/1984 | Mongoven et al. | 315/130 |
| 4,710,926 A | * | 12/1987 | Brown et al. | 709/248 |
| 4,952,880 A | * | 8/1990 | Clinton | 324/544 |
| 5,170,391 A | * | 12/1992 | Arnold et al. | 370/232 |
| 5,267,117 A | * | 11/1993 | Moore | 361/116 |
| 5,487,071 A | * | 1/1996 | Nordstrand et al. | 370/236 |
| 5,949,757 A | * | 9/1999 | Katoh et al. | 370/232 |
| 6,018,300 A | * | 1/2000 | Dowden et al. | 340/635 |
| 6,198,743 B1 | * | 3/2001 | Giroux et al. | 370/235.1 |
| 6,226,265 B1 | * | 5/2001 | Nakamichi et al. | 370/235 |
| 6,334,194 B1 | * | 12/2001 | Hihara | 712/32 |
| 6,381,214 B1 | * | 4/2002 | Prasad | 370/230.1 |
| 6,421,632 B1 | * | 7/2002 | LeCorney | 702/185 |

FOREIGN PATENT DOCUMENTS

| | | |
|---|---|---|
| DE | 25 44 929 | 4/1977 |
| DE | 28 03 002 | 8/1979 |
| DE | 43 02 908 | 3/1994 |
| GB | 1 502 415 | 3/1978 |
| WO | WO 93 20527 | 10/1993 |

* cited by examiner

Primary Examiner—Marc S. Hoff
Assistant Examiner—Edward Raymond
(74) Attorney, Agent, or Firm—Fish & Richardson P.C.

(57) ABSTRACT

A method for detecting faults, in particular transient faults which cannot be verified which occur in an electrical unit, such as a switching device, by means of a fault counter which, when a fault occurs, counts by a specific first counting value in a first counting direction and which, at specific times, in each case counts by a second counting value in an opposite second counting direction in the situation where no faults have occurred within the relevant time interval. A precautionary alarm signal is triggered on reaching a first counting threshold value in the first counting direction. A second alarm signal, in conjunction with the monitored unit being switched off, is produced on reaching or exceeding a second counting threshold value, which is higher than the first counting threshold value.

4 Claims, 1 Drawing Sheet

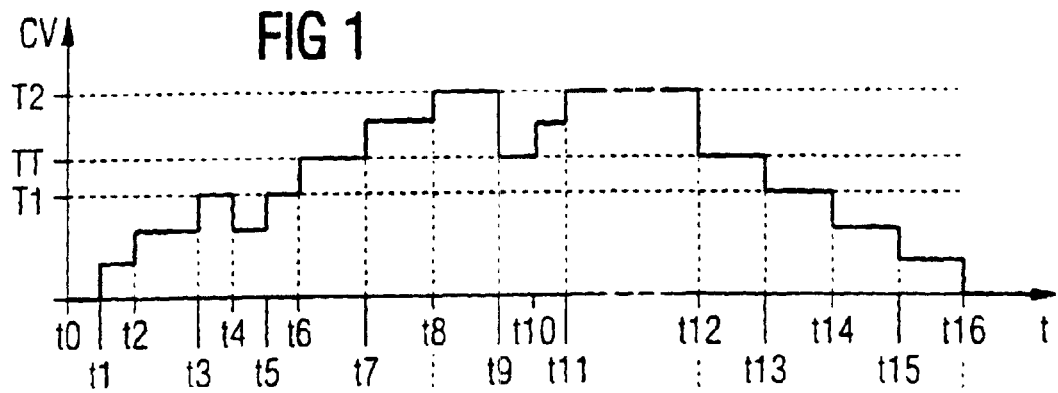
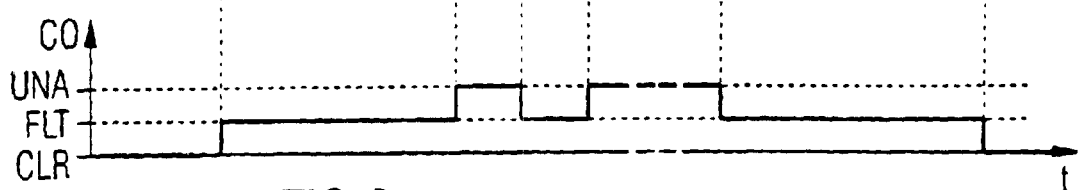
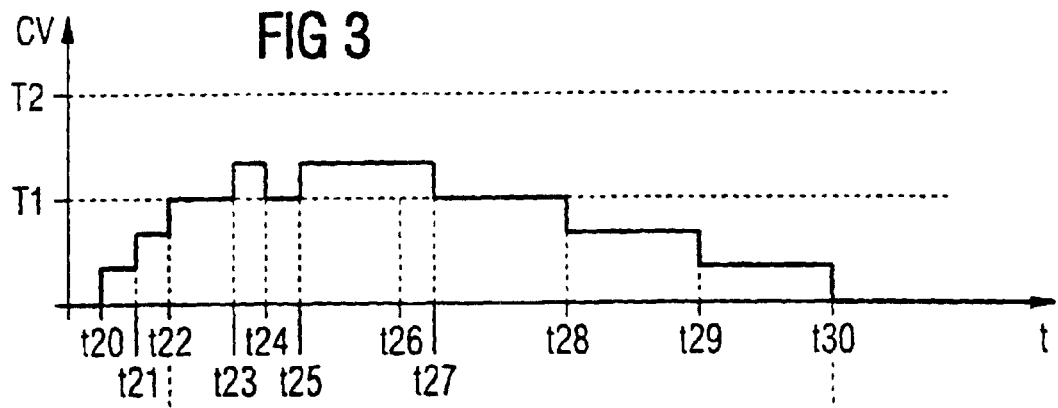
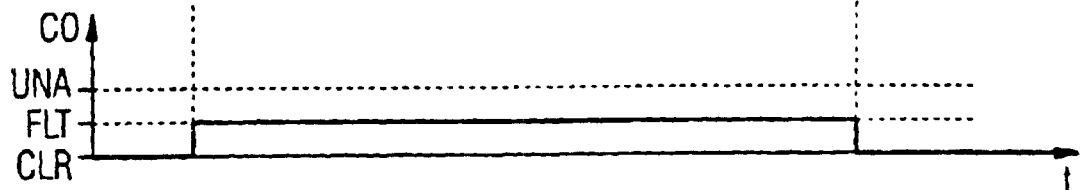

METHOD FOR DETECTING FAULTS IN A SWITCHING DEVICE

BACKGROUND OF THE INVENTION

1. Field of the Invention

The present invention generally relates to methods for detection of faults which occur in an electrical unit, such as a switching device. In particular, the present invention relates to methods for detection of transient faults which cannot be verified.

2. Brief Discussion of the Related Art

The method of the present invention detects faults, in particular transient faults which cannot be verified, which occur in a switching device. The method uses a fault counter which, when a fault occurs, counts by a specific first counting value in a first counting direction. At specific times in each case, the fault counter counts by a second counting value which is greater or less than the first counting value, or is equal to the first counting value, in a second counting direction, which is the opposite of the first counting direction, in situations where the relevant unit has operated without any faults within a predetermined time interval. An alarm signal is triggered when the relevant fault counter reaches or exceeds a defined counting threshold value in the one counting direction. The fault counter of the present invention is sometimes referred to as a leaky bucket counter.

What is meant by transient faults are faults which cannot be verified, that is to say, faults which occur sporadically and cannot be associated with specific causes.

In one practical embodiment, the occurrence of such faults leads to counting by two in each case in the first counting direction, and counting by one in each case in the second counting direction at the defined times. This means that faults which occur only sporadically do not lead to the immediate triggering of an alarm, while those faults which occur frequently do result in the relevant alarm being triggered. If, on the other hand, the relevant faults no longer occur, the fault counter will count in said second counting direction until a specific counter position is reached, at which no further actions need be taken any longer.

It is thus evident that an alarm signal is triggered only on reaching or exceeding the defined counting threshold value in said first counting direction, and this then leads to fault localization and fault rectification measures, although this is sometimes regarded as being too late.

A method for detection of faults which occur in at least one electrical unit, in particular a switching device, is given in WO 93/20527, in which the procedure described above is used. In this case, there are three monitoring parameters which play a major role, namely a disturbance step, the level of a lower limit (floor) and the level of an upper limit (ceiling). Said disturbance step in this case represents that variable by which an existing fault counter counts up in steps. No actions are taken until the fault counter reaches the upper limit value (ceiling C).

Furthermore, a method and a circuit arrangement for determination of critical faults is given in DE 43 02 908, which can occur in a system such as a communications system. For this purpose, fault signals are sorted on the basis of predetermined criteria, with each fault event being assigned a threshold value (number of fault events per unit time) associated with a time interval, such that a fault is classified and signaled as being critical when this threshold value is exceeded. If the number of fault events occurring within a time interval is less than the threshold value, the value which is stored in the event counter at the start of the next time interval is defined taking account of the number of fault events determined during the most recent time interval. This means that serious faults whose frequency is below the threshold value are detected.

An indirectly controlled switching system is discussed in DE 28 03 002, in which devices which use plausibility checks are used for identification of faults, and in which sporadically occurring faults are signaled when an adjustable threshold is exceeded.

GB 1 502 415 discusses quality monitoring relating to connection attempts to be carried out in a telephone switching device. Two counters are provided for this purpose, and are used to count connection attempts. One counter, which is referred to as the one's counter, in this case counts up to 100 and emits a counting pulse to the other counter once it has counted 100 connection attempts, with this other counter having ten counting stages and being referred to as the hundred's counter. These two counters can thus be used to count 1000 connection attempts. Furthermore, two fault counters are provided, using which faulty connection attempts are counted. The one fault counter, which is referred to as the mean-value fault counter, can count, for example, up to 25. This fault counter is reset to zero when the hundred's counter reaches its zero count position, that is to say when 1000 connection attempts have been counted. The other fault counter, which is referred to as the peak-value fault counter, can count, for example, up to 40 and is reset to zero when the one's counter reaches its zero count position, that is to say when 100 connection attempts have been counted. The mean-value fault counter thus emits an output signal if 2.5% of the connection attempts were faulty, and the peak-value fault counter emits an output signal if 40% of the connection attempts were faulty. In the former case, only an early warning about the existence of faulty connection attempts is emitted, which do not require any urgent countermeasures. However, in the second case, a serious warning is emitted, which requires counter-measures to be taken urgently.

This known prior art provides for the introduction of two warnings, but there is no provision whatsoever for the telephone switching device to be switched off upon reaching a specific fault threshold.

In contrast, the present invention provides a way in which a certain amount of early warning can be obtained firstly, in a relatively simple manner and in the course of detection of faults using a method of the type mentioned initially, without the respectively faulty unit, or the device containing it, having to be switched off immediately, and, secondly, how the time interval can be lengthened in a relatively simple manner once such an early warning has been emitted, during which time interval, if required, faults which occur can be detected once again.

According to the present invention, a first alarm signal is triggered on reaching or exceeding a further counting threshold value, which is below said defined counting threshold value and which signals only the occurrence of faults in the relevant unit, in that a second alarm signal is triggered, in conjunction with the respective unit being switched off, only on reaching or exceeding the one said counting threshold value which is higher than the former, and in that on reaching only said further counting threshold value and the faults subsequently not being evident, or if the count falls below the relevant further counting threshold value due to faults not being evident, the time interval between any two of said times at which said fault counter counts in the second counting direction is lengthened.

The present invention offers the advantage that the detection of faults which occur in an electrical unit, in particular a switching device, by the fault counter can be used in a particularly simple manner to provide an early warning, so that this makes it possible to monitor the relevant unit and, if necessary, to take particular actions at an early stage. Therefore, it is possible to identify the relevant faults and/or to identify the reasons for the occurrence of the relevant faults. This is particularly advantageous in the case of transient faults which cannot be verified and which occur only sporadically, and which cannot be identified by the conventional fault testing routines which are normally provided in electrical units. Relevant observation can be extended over a relatively long active period of the fault counter for detecting any faults which may occur again, without having to change its counting capacity.

Switching-off of the respective unit is cancelled once again after a defined further time interval, and the fault counter is set to a checking count position, which is between the two said counting threshold values. This measure has the advantage that it allows a unit which has become fully serviceable again, for example as a result of self-healing effects of electrical components after a certain period of time, to be switched on again without there being any need to replace it. Secondly, this measure advantageously makes it possible to localize specific detected faults which do not disappear as a result of the self-healing effects mentioned above.

A count position is chosen as the checking count position at which at least one further fault within said defined one time interval once again triggers an alarm and leads to the respective unit being switched off. This advantageously ensures that, if the relevant monitored unit is still faulty, it is switched off again as quickly as possible.

The fault counter counts in the second counting direction until the relevant fault counter reaches a specific counter position, in particular the zero count position. This has the advantage that the fault counter operates in a particularly simple manner.

SUMMARY OF THE INVENTION

It is an object of the present invention to provide a method of detection of faults using a method of the type mentioned initially, without the respectively faulty unit, or the device containing it, having to be switched off immediately.

It is a further object of the present invention to provide a method for detecting faults wherein the time interval can be lengthened in a relatively simple manner once such an early warning has been emitted, during which time interval, if required, faults which occur can be detected once again.

It is an additional object of the present invention to provide a method for detection of transient faults which cannot be verified and which occur only sporadically, and which cannot be identified by the conventional fault testing routines which are normally provided in electrical units.

It is yet a further object of the present invention to provide a method for detection of faults in which a fault counter can be used in a particularly simple manner to provide an early warning, so that this makes it possible to monitor the relevant unit and to identify the relevant faults and/or to identify the reasons for the occurrence of the relevant faults.

These and other objects of the invention will become apparent upon careful review of the following detailed description of the presently preferred embodiments which is to be read in conjunction with a review of the accompanying drawing figures.

BRIEF DESCRIPTION OF THE DRAWING FIGURES

FIG. 1 shows a timing diagram of count states of a fault counter according to the present invention;

FIG. 2 shows a timing diagram to show various output signals from a fault counter according to the present invention;

FIG. 3 shows a timing diagram of count states of a fault counter according to the present invention; and FIG. 4 shows a timing diagram of various output signals from a fault counter according to the present invention.

DETAILED DESCRIPTION OF THE PRESENTLY PREFERRED EMBODIMENTS

FIG. 1 uses a timing diagram which shows various counter states (ordinate CV) of a fault counter plotted on a time axis t (abscissa), by means of which faults which occur in at least one electrical unit, in particular a switching device, are detected. These faults are, in particular, sporadically occurring faults, that is to say transient faults, which cannot be verified. In the present case, the fault counter is an up/down counter which counts by a specific first count value in a first counting direction when a fault occurs, for example counts in its up counting direction, and which counts in a second counting direction, the down counting direction, at defined times, which will be described in more detail later, in each case by a second count value, which may be greater than or less than the first count value or may be equal to the first count value, in the situation where the monitored unit has operated without any faults within said time interval between two of said times. In the present case, the count values in the up counting direction and the down counting direction are each of equal magnitude; however, in this case, the relevant count values are, for example, 1.

According to FIG. 1, the fault counter is in its output counter position at the time t0, which is normally the counter position zero. A fault may have been detected by the fault counter at each of the times t1, t2 and t3, in response to which the fault counter has counted by three count values in the up counting direction. A first counting threshold value T1 of the relevant fault counter is thus reached at the time t3. On reaching this first counting threshold value T1, the relevant fault counter (as is shown in the timing diagram in FIG. 2) emits an alarm signal, or triggers such a signal. This is illustrated in FIG. 2 by the step-function signal change, which is plotted along the time axis t (abscissa) in the counter output signal CO (ordinate direction) from the output signal level CLR (counter position 0) to the output signal level FLT (faulty state).

At the time t4, as the start time for down counting, the fault counter then carries out a counting process in its down counting direction, provided no further fault has been detected at this time. The next time at which such a counting process in the down counting direction will be carried out is the time t6. However, if, as shown in FIG. 1, a further fault occurs at the time t5 within the time interval from t4 to t6, and, in addition, yet another fault occurs at the time t6. In consequence, the fault counter has in each case counted onward by a count value in its up counting direction.

A further fault has been found within the time interval from t6 to t7, to be precise at the time t7. A corresponding situation also applies to the time interval from t7 to t8, so that the relevant fault counter has in each case counted onward by a further count value in its up counting direction. It was thus not possible for down-counting to take place at the relevant times.

A second counting threshold value T2 is thus reached at the time t8. As can be seen from the associated timing diagram in FIG. 2, this leads to a further step-function change in the signal level from the output signal level FLT to the output signal level UNA (alarm signal and the monitored unit being switched off) occurring in the counter output signal CO.

While, initially, an alarm signal was just triggered as a certain early warning on reaching the first counting threshold value T1 as shown in FIG. 1, a second alarm signal is now triggered, in conjunction with the monitored unit being switched off, on reaching the second counting threshold value T2 at the time t8.

At the time t9 in FIG. 1, which may, for example, be a time in the order of magnitude of one hour after the time t8, the fault counter is reset to a checking count position (TT), which is between the two counting threshold values T1 and T2. In this case, this checking count position is defined such that only the occurrence of two successive faults within said defined one time interval, starting at the time (t10) and ending at the time (t11), results in the fault counter in each case counting by said count value in its up counting direction, and then in another alarm being triggered and the monitored unit being switched off. This situation where two successive faults occur within said time interval is assumed in FIG. 1.

Faults such as these have occurred at each of the times t10 and t11. The counting threshold value T2 is thus reached once again, and this results in another alarm being triggered in conjunction with the monitored unit being switched off.

The relevant unit is started up again within the time interval from t9 to t11, as indicated in FIG. 2, with only a provisional alarm signal (output signal level FLT) being produced.

At a time t12 which may, for example, be one hour after the time t11, the fault counter is once again reset to the checking count position TT between the two counting threshold values T1 and T2. At the same time, the switching off of the monitored unit is cancelled, as is indicated in an appropriate manner in FIG. 2. At the times t13, t14, t15 and t16, the fault counter counts by the specific count value in its down counting direction on each occasion, since it is assumed that no more faults occur within the time intervals t12 to t13, t13 to t14 and t14 to t15 or t16. The fault counter then reaches its output counter position zero at the time t16, with the alarm signal FLT being cancelled once again as shown in FIG. 2 (see the change from the output signal level FLT to the output signal level CLR at the time t16).

Using a similar timing diagram to that in FIG. 1, FIG. 3 shows, plotted on a time axis t (abscissa), various count states CV (ordinate) of the fault counter which is used to monitor at least one electrical unit, in particular a switching device, for the occurrence of faults, to be precise in particular for the occurrence of transient faults which cannot be verified. The various count states are in this case plotted along a time axis t, and the two counting threshold values T1 and T2 are once again plotted in the ordinate direction CV of the diagram in FIG. 3. In this case, it is assumed that the fault counter detects a fault at each of the times t20, t21 and t22, so that this counter counts three times by a specific count value in its up counting direction.

The counting threshold value T1 is then reached at the time t22, leading to a fault signal being triggered, as is illustrated in the timing diagram in FIG. 4 by the step-function change in signal level from CLR to FLT. This timing diagram shows various output signal levels CLR, FLT and UNA (in the ordinate direction) which the fault counter output signal CO can assume, plotted against a time axis t.

The method of operation of said fault counter may in this case initially be the same as in the case of the relationships shown in FIG. 1. This means that a down counting process takes place at the time t24 at the start of the relevant fault counter starting to count downward, provided no further fault has occurred at this time. However, no such further fault has occurred at the time t24, according to FIG. 3, so that this leads to the fault counter counting by one count value in its down counting direction.

However, in contrast to the relationships explained in FIG. 1, FIG. 3 provides for the time interval between two respective times, at which the fault counter counts in its down counting direction, to be lengthened on reaching only the first counting threshold value T1 under consideration and if there are subsequently no faults evident, or if the count falls below this counting threshold value T1 owing to the lack of faults.

According to FIG. 3, the time interval extends, for example, from the time t24 to the time t26. It is thus longer than the corresponding time interval from, for example, t12 to t13, t13 to t14, t14 to t15 or t15 to t16. However, in the present case, a further fault occurs at the time t25 within the time interval just mentioned, and once again leads to the fault counter counting in its up counting direction. The fault counter thus no longer counts downward at the time t26, since a further fault has occurred in the meantime at the time t25.

If no further fault has occurred within the time interval t25 to t27, the fault counter counts by one count value in its down counting direction at the time t27. The time interval from t25 to t27 is in this case just as long as the previously mentioned time interval from t24 to t26.

If no further faults occur in any of the time intervals from t27 to t28, from t28 to t29 or from t29 to t30, the fault counter counts downward further, so that it reaches its output counter position zero once again at the time t30. The output of the alarm signal (output signal level FLT) also stops once again at the time t30, according to FIG. 4.

Thus, with respect to the relationships illustrated in FIG. 1, the time intervals of the down-counting of the fault counter are lengthened in FIG. 3. Use is made of this "safety measure" in which case only when the count or the counter position of the fault counter reaches or exceeds only the first counting rapid value and the monitored unit subsequently operates without any faults. Apart from this, and in contrast to the relationships already explained in conjunction with FIG. 3, it is then possible for the counting-down time interval, which has been lengthened in comparison to FIG. 1, to be retained from the time t24, even if a fault still occurs at the time t25.

Finally, it should also be mentioned that alarm signals are in each case triggered on reaching the count threshold values T1 and T2 in the course of the above processes. It may be perceived that such alarm signals can also be triggered only when the relevant counting threshold values T1 and T2 are exceeded by corresponding counter positions of the fault counter.

Furthermore, it should be mentioned that the checking count position TT defined between the two counting threshold values T1 and T2 in FIG. 1 can also be defined, in contrast to the relationships explained above, such that, once the switching-off of the monitored unit has been cancelled, this unit is switched off again, to be precise possibly finally, with another alarm being triggered if just one further fault occurs within said defined one time interval.

Although modifications and changes may be suggested by those skilled in the art to which this invention pertains, it is the intention of the inventors to embody within the patent warranted hereon all changes and modifications that may reasonably and properly come under the scope of their contribution to the art.

What is claimed is:

1. A method for detecting transient faults in a switching device, the method comprising the steps of:

counting in a fault counter by a specific first counting value, in a first counting direction, when a fault occurs;

counting in the fault counter at specific times in each case, by a second counting value which is greater or less than that said first counting value, or is equal to the first counting value in a second direction, which is opposite to said first counting direction, the situation when the relevant unit has operated without any faults within a time interval provided between two such times;

triggering an alarm signal when the relevant fault counter reaches or exceeds a defined counting threshold value in said first counting direction;

triggering a first alarm signal on reaching or exceeding a further counting threshold value which is below said defined counting threshold value and which only signals the occurrence of faults in the relevant unit; and triggering a second alarm signal in conjunction with the respective unit being switched off, only on reaching or exceeding said counting threshold value, which is higher that the former, and in that on reaching only said further counting threshold and the faults subsequent not being evident, of if the count falls below the relevant further counting threshold value due to faults not being evident, the time interval between any two of said times at which said fault counter counts in the second counting direction is lengthened.

2. The method claimed in claim 1, further comprising the steps of:

canceling the switching-off of the respective unit after a defined further time interval; and setting the fault counter to a checking counter position which is between the two said counting threshold values.

3. The method claimed in claim 2, further comprising the step of:

choosing the checking point count position to be a count position at which at least one further fault within said defined one time interval triggers another alarm and leads to the respective unit being switched off.

4. The method of claim 3, further comprising the step of:

counting in the fault counter in the second direction until the relevant fault counter reaches a specific counter potion, in particular the zero count position.

* * * * *